US012219563B2

(12) United States Patent
Bae et al.

(10) Patent No.: US 12,219,563 B2
(45) Date of Patent: Feb. 4, 2025

(54) SYSTEMS, METHODS, AND APPARATUS FOR MULTIPLEXING CONTROL INFORMATION ON A PHYSICAL CHANNEL

(71) Applicant: Samsung Electronics Co., Ltd., Suwon-si (KR)

(72) Inventors: Jung Hyun Bae, San Diego, CA (US); Hamid Saber, San Diego, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 169 days.

(21) Appl. No.: 17/367,310

(22) Filed: Jul. 2, 2021

(65) Prior Publication Data

US 2022/0030583 A1   Jan. 27, 2022

Related U.S. Application Data

(60) Provisional application No. 63/057,280, filed on Jul. 27, 2020.

(51) Int. Cl.
*H04W 72/21* (2023.01)
*H04L 1/00* (2006.01)
(Continued)

(52) U.S. Cl.
CPC ........... *H04W 72/21* (2023.01); *H04L 1/0013* (2013.01); *H04L 1/1812* (2013.01); *H04L 5/0055* (2013.01)

(58) Field of Classification Search
CPC .... H04W 72/21; H04L 1/0013; H04L 1/1812; H04L 5/0055
See application file for complete search history.

(56) References Cited

U.S. PATENT DOCUMENTS 9,030,957 B2   5/2015 Seo et al.
9,210,695 B2   12/2015 Kim et al.
(Continued)

FOREIGN PATENT DOCUMENTS

WO       2019203246 A1   10/2019
WO   WO2021145107 A1 *   8/2021

*Primary Examiner* — Christopher M Crutchfield
*Assistant Examiner* — Tito Q Pham
(74) *Attorney, Agent, or Firm* — Renaissance IP Law Group LLP

(57) ABSTRACT

A method may include multiplexing control information on a physical channel in a communication system, wherein the control information comprises a repeat request acknowledgment portion, and allocating an amount of resources of the physical channel for the repeat request acknowledgment portion based on an amount of a type of acknowledgment included in the acknowledgment portion. The type of acknowledgment may include an acknowledgment for dynamically granted traffic. The amount of resources may include a reserved amount of resources based on the amount of acknowledgment for dynamically granted traffic being less than a threshold. A method may include multiplexing control information on a physical channel in a communication system, wherein the control information may include a repeat request acknowledgment portion, and allocating an amount of resources of the physical channel for the repeat request acknowledgment portion based on a threshold, wherein the threshold is variable.

19 Claims, 9 Drawing Sheets

(51) Int. Cl.
*H04L 1/1812* (2023.01)
*H04L 5/00* (2006.01)

(56) References Cited

U.S. PATENT DOCUMENTS

| | | | |
|---|---|---|---|
| 9,344,999 | B2 | 5/2016 | Lee et al. |
| 9,485,060 | B2 | 11/2016 | Nazar et al. |
| 9,520,984 | B2 | 12/2016 | Yang et al. |
| 10,433,288 | B2 | 10/2019 | Yang et al. |
| 10,530,528 | B2 | 1/2020 | Park et al. |
| 10,601,567 | B2 | 3/2020 | Marinier et al. |
| 10,638,462 | B2 | 4/2020 | Park et al. |
| 10,735,170 | B2 | 8/2020 | Yang et al. |
| 10,952,186 | B2 | 3/2021 | Xiong et al. |
| 11,050,542 | B2 * | 6/2021 | Park ................... H04B 7/0413 |
| 2011/0205981 | A1 | 8/2011 | Koo et al. |
| 2011/0286391 | A1 * | 11/2011 | Chen .................. H04W 52/265 370/328 |
| 2012/0113831 | A1 | 5/2012 | Pelletier et al. |
| 2015/0131494 | A1 * | 5/2015 | He ...................... H04B 7/0452 370/280 |
| 2015/0172006 | A1 * | 6/2015 | Wang .................... H04L 1/1829 370/329 |
| 2018/0310257 | A1 * | 10/2018 | Papasakellariou .... H04W 72/23 |
| 2019/0313419 | A1 * | 10/2019 | Fakoorian ............. H04L 5/0055 |
| 2019/0356455 | A1 | 11/2019 | Yang et al. |
| 2020/0007296 | A1 * | 1/2020 | Papasakellariou ...... H04L 5/001 |
| 2020/0213044 | A1 * | 7/2020 | Peng ..................... H04L 1/1864 |
| 2020/0228248 | A1 * | 7/2020 | Islam .................... H04L 1/1861 |
| 2020/0235864 | A1 | 7/2020 | Li et al. |
| 2020/0374089 | A1 | 11/2020 | Yang et al. |
| 2021/0314104 | A1 * | 10/2021 | Yin ....................... H04W 72/56 |
| 2022/0053552 | A1 * | 2/2022 | Li ......................... H04L 5/001 |
| 2022/0104241 | A1 * | 3/2022 | Zou ................... H04W 72/1268 |
| 2022/0191913 | A1 * | 6/2022 | Matsumura ........... H04L 1/1614 |
| 2022/0271873 | A1 * | 8/2022 | Gao ..................... H04L 1/1854 |
| 2022/0312445 | A1 * | 9/2022 | Yin ....................... H04L 1/1664 |
| 2022/0393829 | A1 * | 12/2022 | Kim ......................... H04L 1/18 |
| 2023/0043456 | A1 * | 2/2023 | Li ......................... H04W 72/23 |
| 2023/0046263 | A1 * | 2/2023 | Wong ................... H04W 72/569 |
| 2023/0054490 | A1 * | 2/2023 | Wong .................... H04L 1/1671 |
| 2023/0180237 | A1 * | 6/2023 | Yoshimura ........ H04W 72/1268 370/329 |

\* cited by examiner

SYSTEMS, METHODS, AND APPARATUS FOR MULTIPLEXING CONTROL INFORMATION ON A PHYSICAL CHANNEL

CROSS-REFERENCE TO RELATED APPLICATION

This application claims priority to, and the benefit of, U.S. Provisional Patent Application Ser. No. 63/057,280 titled "Methods for Hybrid Automatic Repeat Request (HARQ)" filed Jul. 27, 2020 which is incorporated by reference.

TECHNICAL AREA

This disclosure relates generally to communication systems, and specifically to systems, methods, and apparatus for multiplexing control information on a physical channel.

BACKGROUND

A communication system may multiplex control information such as a positive acknowledgment (ACK) or a negative acknowledgment (NACK) on a channel such as a physical uplink shared channel (PUSCH).

The above information disclosed in this Background section is only for enhancement of understanding of the background of the invention and therefore it may contain information that does not constitute prior art.

SUMMARY

A method may include multiplexing control information on a physical channel in a communication system, wherein the control information comprises a repeat request acknowledgment portion, and allocating an amount of resources of the physical channel for the repeat request acknowledgment portion based on an amount of a type of acknowledgment included in the acknowledgment portion. The type of acknowledgment may include an acknowledgment for dynamically granted traffic. Allocating the amount of resources may include allocating a variable amount of resources based on the amount of acknowledgment for dynamically granted traffic exceeding a threshold. The multiplexing may include rate matching. Allocating the amount of resources may include allocating a reserved amount of resources based on the amount of acknowledgment for dynamically granted traffic being less than a threshold. The amount of acknowledgment may include a number of acknowledgment bits. The multiplexing may include puncturing. The repeat request acknowledgment portion may include a codebook. The physical channel may include a physical uplink shared channel (PUSCH), and the codebook may include a Type-2 hybrid automatic repeat request acknowledgment (HARQ-ACK) codebook.

A method may include multiplexing control information on a physical channel in a communication system, wherein the control information may include a repeat request acknowledgment portion, and allocating an amount of resources of the physical channel for the repeat request acknowledgment portion based on a threshold, wherein the threshold is variable. The threshold may be based on an amount of a type of acknowledgment included in the acknowledgment portion. The threshold may include a first component based on a first type of acknowledgment, and a second component based on a second type of acknowledgment. The first component may include a variable amount based on one or more acknowledgments for semi-persistently scheduled traffic, and the second component may include a fixed amount based on one or more acknowledgments for dynamically granted traffic. The first component may be based on one or more configurations for semi-persistently scheduled traffic, and the second component may include an amount based on one or more acknowledgments for dynamically granted traffic. The first component may include an amount based on one or more acknowledgments for semi-persistently scheduled traffic, and the second component may include an amount based on an assignment index. The first component may include an amount based on one or more acknowledgments for semi-persistently scheduled traffic, and the second component may include an amount based on a radio resource control (RRC) configuration. The threshold may be based on a change in an amount of acknowledgments for semi-persistently scheduled traffic. Allocating the amount of resources may include allocating a reserved amount of resources based on the threshold and a size of the acknowledgment portion. Allocating the amount of resources may include allocating a variable amount of resources based on the threshold and a size of the acknowledgment portion, and the multiplexing may include rate matching. The threshold may be based on an error probability of a size of the repeat request acknowledgment portion. The error probability may be based on a number of downlink control information (DCI) transmissions.

An apparatus may include a transceiver configured to multiplex a repeat request acknowledgment payload on a physical channel, and a controller configured to allocate an amount of resources of the physical channel to the repeat request acknowledgment payload based on a number of acknowledgments for dynamically granted traffic included in the payload. The controller may be further configured to allocate a reserved amount of resources based on the number of acknowledgments for dynamically granted traffic included in the payload and a number of acknowledgments for semi-persistently scheduled traffic included in the payload.

BRIEF DESCRIPTION OF THE DRAWINGS

The figures are not necessarily drawn to scale and elements of similar structures or functions are generally represented by like reference numerals or portions thereof for illustrative purposes throughout the figures. The figures are only intended to facilitate the description of the various embodiments described herein. The figures do not describe every aspect of the teachings disclosed herein and do not limit the scope of the claims. To prevent the drawing from becoming obscured, not all of the components, connections, and the like may be shown, and not all of the components may have reference numbers. However, patterns of component configurations may be readily apparent from the drawings. The accompanying drawings, together with the specification, illustrate example embodiments of the present disclosure, and, together with the description, serve to explain the principles of the present disclosure.

DETAILED DESCRIPTION

Overview

Figure 1:
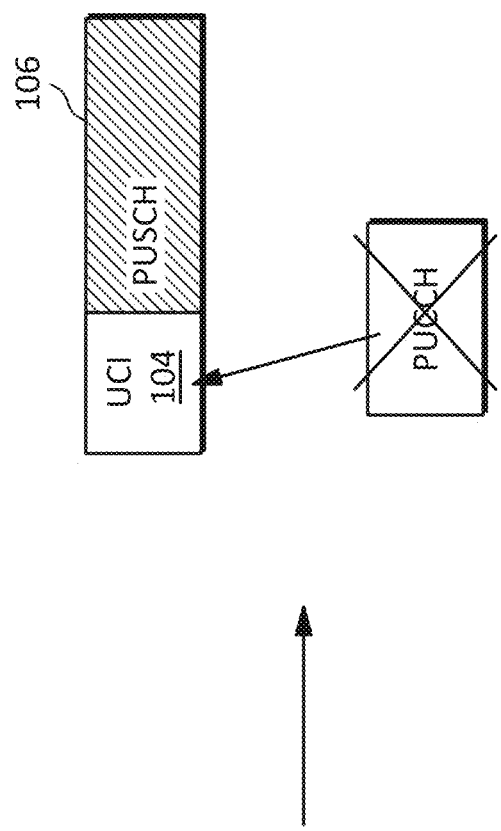
FIG. 1 illustrates an example of multiplexing UCI on a PUSCH in accordance with example embodiments of the disclosure.
Figure 1:
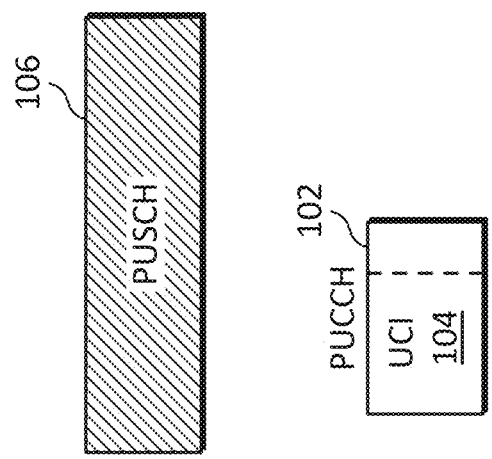

In some communication systems in accordance with example embodiments of the disclosure, control information such as repeat request ACK/NACK information may be multiplexed with other data onto a channel, for example, a physical uplink shared channel (PUSCH). To provide reliable reception of the control information, a base station and a user equipment (UE) may use a predetermined scheme to multiplex the control information onto the channel. The predetermined scheme may specify, for example, the size of an ACK/NACK payload (e.g., the number of bits and whether the number is fixed or variable), and a multiplexing technique (e.g., puncturing or rate matching). Thus, based on the predetermined technique, the UE may transmit a specified number of ACK/NACK bits using a specified multiplexing scheme in a PUSCH transmission. The base station may decode the ACK/NACK bits with a high probability of success because it is aware of the payload size and multiplexing technique.

In some situations, however, a UE may transmit an ACK/NACK payload having a size that is different than what the base station expects, thereby resulting in more frequent decoding failures. A difference between the size of the ACK/NACK payload transmitted by the UE, and the size of the ACK/NACK payload expected by the base station may be referred to as an ACK/NACK payload size error. In some embodiments, an ACK/NACK payload size error may be caused by one or more of the following factors.

In some embodiments, a communication specification may require the base station and UE to use a fixed number of reserved ACK/NACK bits (and a puncturing multiplexing technique) in a multiplexed PUSCH transmission if the ACK/NACK payload is less than or equal to a certain fixed threshold (e.g., 2 bits). But if the ACK/NACK payload is greater than the fixed threshold, the specification may require the base station and UE to use a variable number of ACK/NACK bits (and a rate matching multiplexing technique).

In some embodiments, using a payload size with a fixed number of reserved ACK/NACK bits may be more robust (e.g., tolerant of ACK/NACK payload size errors) than using a payload size with a variable number of ACK/NACK bits.

Moreover, in some embodiments, different types of bits in an ACK/NACK payload may be associated with different types of downlink traffic, and the number of each type of bit in the payload may determine the probability of an ACK/NACK payload size error. For example, in some embodiments, a base station may send both dynamic grant (DG) downlink transmissions and semi-persistently scheduled (SPS) downlink transmissions to a UE. However, depending on the implementation details, an ACK/NACK payload having a relatively low number of DG ACK/NACK bits may have a relatively high probability of causing an ACK/NACK payload size error.

Therefore, in some embodiments, when an ACK/NACK payload has a relatively low number of DG ACK/NACK bits, it may be beneficial to use a fixed number of reserved ACK/NACK bits in the multiplexed PUSCH transmission to reduce payload size errors, and therefore, decoding failures.

However, in some embodiments, the rigid requirements of a communication specification may prevent the base station and/or the UE from using a more beneficial technique to determine the size and/or type of ACK/NACK bits in a multiplexed PUSCH transmission. For example, in some embodiments, a specification may allow an ACK/NACK payload to include a relatively large number of SPS ACK/NACK bits (for example, 9) along with a relatively small number of DG ACK/NACK bits (for example, 1). Thus, it may be beneficial to use a scheme with a fixed number of reserved ACK/NACK bits in the multiplexed PUSCH transmission to reduce payload size errors. However, if the specification has a relatively low fixed threshold (e.g., 2 bits), it may require the UE to use a variable number of ACK/NACK bits because the total ACK/NACK payload (in this example, 10 bits) exceeds the threshold.

Some communication systems and/or methods in accordance with example embodiments of the disclosure may use a variable threshold for determining whether to use a fixed number of reserved ACK/NACK bits or a variable number of ACK/NACK bits in a multiplexed PUSCH transmission. In some embodiments, a variable threshold may be based on a number of DG ACK/NACK bits. For example, in some embodiments, a variable threshold (T) may include a first component ($T_{SPS}$) equal to a number of SPS ACK/NACK bits, and a second component ($T_{DG}$) equal to any fixed number of DG ACK/NACK bits (e.g., 1, 2, etc.). In the situation described above with 9 SPS ACK/NACK bits and 1 DG ACK/NACK bit, the total ACK/NACK payload may be 10 bits. However, if a variable threshold is used with $T_{DG}$ set to 2, then the variable threshold (T) may be 9+2=11. Thus, the UE may be able to use a fixed number of reserved ACK/NACK bits because now the total ACK/NACK payload does not exceed the threshold. This, in turn, may prevent an ACK/NACK payload size error from causing a decoding failure.

This disclosure encompasses numerous inventive principles relating to multiplexing control information. These principles may have independent utility and may be embodied individually, and not every embodiment may utilize every principle. Moreover, the principles may also be embodied in various combinations, some of which may amplify the benefits of the individual principles in a synergistic manner.

Example Embodiments

Some example embodiments of systems, apparatus, devices, processes, methods, and/or the like illustrating some possible implementation details according to this disclosure are described herein. These examples are provided for purposes of illustrating the principles of this disclosure, but the principles are not limited to or defined by these embodiments, implementation details, and/or the like. For example, some embodiments may be described in the context of 5G and/or New Radio (NR) wireless communication systems, but the principles may also be applied to any other types of wired and/or wireless systems including 3G, 4G and/or future generations of wireless networks, and/or any other communication systems that may implement multiplexing of control information. As another example, some embodiments may be described in the context of hybrid automatic repeat request acknowledgment (HARQ-ACK) schemes and/or specific multiplexing techniques, but the principles may also be applied to any other types of acknowledgment and/or multiplexing techniques.

UCI Multiplexing on PUSCH

In some NR systems, a UE may transmit uplink control information (UCI) to a base station (which may be referred to as a gNodeB or gNB). In some systems in accordance with example embodiments of the disclosure, UCI may contain any type of information that may support one or more uplinks and/or related downlinks. For example, in an NR system, the UCI may include one or more of: scheduling requests (SRs) for scheduling uplink shared channel (UL-SCH) transmissions; channel state information (CSI), which may report one or more properties of a channel, for example, to enable the gNB and/or UE to adjust channel parameters; acknowledgment (ACK/NACK) information; and/or the like Some embodiments of NR systems may implement a HARQ-ACK scheme in which a UE may provide feedback to a gNB on the failure or success of each downlink transmission. The feedback to the gNB may be provided in the form of HARQ-ACK bits sent in the UCI. For example, the gNB may re-transmit a specific data transmission in response to receiving UCI with a NACK corresponding to that specific data transmission.

In some embodiments of NR systems, UCI may generally be transmitted from the UE to the gNB on a physical uplink control channel (PUCCH). However, in certain circumstances, the UCI may be multiplexed with other data onto a PUSCH. For example, if the network schedules the UCI on a PUCCH that overlaps with a PUSCH, or if there is a semi-statically configured PUSCH such as a configured grant (CG) PUSCH, the UE may drop the PUCCH transmission and multiplex the UCI on the PUSCH. In some embodiments, this may be referred to as piggybacking UCI on a PUSCH.

FIG. 1 illustrates an example of multiplexing UCI on a PUSCH in accordance with example embodiments of the disclosure. The network may initially schedule a PUCCH 102 including UCI 104 that may overlap with a PUSCH 106 as shown on the left side of FIG. 1. For one or more reasons, for example, to reduce complexity for the UE, the UE may drop the PUCCH 102 and multiplex the UCI 104 onto the PUSCH 106 as shown on the right side of FIG. 1.

In some embodiments, when multiplexing UCI on a PUSCH, different portions of the UCI may be encoded separately. For example, different types of UCI such as CSI part 1, CSI part 2, and/or HARQ-ACK may be encoded separately. The number of resource elements (REs) that may be used for different portions of the UCI such as HARQ-ACK and/or CSI may be determined, for example, based on one or more of the following: the HARQ-ACK payload size; the CSI payload size; the total number of REs available in the PUSCH (e.g., in a slot of the PUSCH); one or more control parameters such as β and α offsets which may be configured for the UE via radio resource control (RRC) and indicated to the UE via downlink control information (DCI); and/or the like.

In some embodiments, the number of REs that may be used for a HARQ-ACK payload ($Q_{ACK}'$), a CSI part 1 payload ($Q_{CSI-1}'$), and a CSI part 2 payload ($Q_{CSI-2}'$) may be given by the following equations (1), (2), and (3), respectively.

$$Q_{ACK}' = \min\left\{\left\lceil \frac{(O_{ACK} + L_{ACK}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil, \right. \tag{1}$$

$$\left. \left\lceil \alpha \cdot \sum_{l=l_0}^{N_{symb,all}^{PUSCH}-1} M_{sc}^{UCI}(l) \right\rceil \right\}$$

$$Q_{CSI-1}' = \min\left\{\left\lceil \frac{(O_{CSI-1} + L_{CSI-1}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil, \right. \tag{2}$$

$$\left. \left\lceil \alpha \cdot \sum_{l=l_0}^{N_{symb,all}^{PUSCH}-1} M_{sc}^{UCI}(l) \right\rceil - Q_{ACK}' \right\}$$

$$Q_{CSI-2}' = \min\left\{\left\lceil \frac{(O_{CSI-2} + L_{CSI-2}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil, \right. \tag{3}$$

$$\left. \left\lceil \alpha \cdot \sum_{l=l_0}^{N_{symb,all}^{PUSCH}-1} M_{sc}^{UCI}(l) \right\rceil - Q_{ACK}' - Q_{CSI-1}' \right\}$$

where:
$O_{ACK}$ may indicate an ACK/NACK payload size;
$L_{ACK}$ may indicate a CRC size;
$K_r$ may indicate an r-th codebook (CB) size;
$O_{UL-SCH}$ may indicate a number of CBs;
$M_{sc}^{UCI}(l)$ may indicate a number of REs available for UCI in orthogonal frequency-division multiplexing (OFDM) symbol l; and
α and β may indicate RRC control parameters.

After calculating the number of bits that may be used for HARQ-ACK, CSI part 1, and/or CSI part 2, the coded bits of HARQ-ACK, CSI part 1, and/or CSI part 2 may be placed in REs of the PUSCH in locations such as those illustrated below. In some embodiments, multiplexing UCI such as HARQ-ACK and/or CSI may reduce the number of REs available for other data such as UL-SCH data bits. Therefore, a subset of other data symbols may be selected to be included in the available REs of the PUSCH as explained in more detail below.

In some embodiments, the reduced number of REs available for other data such as UL-SCH data bits may affect the reliability of transmitting the other data. Thus, in some embodiments, equations (1), (2), and (3), and the parameters used therewith, may be adjusted to provide acceptable reliability of the other data while accommodating the UCI data multiplexed on the PUSCH.

In some embodiments, the number of REs of a PUSCH may be allocated to code bits may be determined as shown in Table 1 as follows:

TABLE 1

| UL-SCH code bits | $g_0^{UL\text{-}SCH}, g_1^{UL\text{-}SCH}, \ldots, g_{G_{UL\text{-}SCH}-1}^{UL\text{-}SCH}$ |
|---|---|
| HARQ-ACK code bits | $g_0^{ACK}, g_1^{ACK}, \ldots, g_{G_{ACK}-1}^{ACK}$ |
| CSI part1 code bits | $g_0^{CSI\text{-}part1}, g_1^{CSI\text{-}part1}, \ldots, g_{G_{CSI\text{-}part1}-1}^{CSI\text{-}part1}$ |
| CSI part2 code bits | $g_0^{CSI\text{-}part2}, g_1^{CSI\text{-}part2}, \ldots, g_{G_{CSI\text{-}part2}-1}^{CSI\text{-}part2}$ |

In some embodiments, no UCI may be mapped to any symbol that carries a demodulation reference signal (DMRS). In some embodiments, HARQ-ACK bits may be mapped to REs located after a set of consecutive DMRS symbols. In some embodiments, the fixed threshold may be implemented, for example, as $T_1=2$.

In some embodiments, a method for multiplexing UCI with other data on a PUSCH in accordance with the disclosure may implement one of two different schemes based on whether the size of a HARQ-ACK payload exceeds a fixed threshold $T_1$. For example, if the size of the HARQ-ACK payload is less than or equal to the fixed threshold $T_1$, a fixed number of REs may be allocated for the HARQ-ACK payload, and a puncturing multiplexing technique may be used. In some embodiments, this may be referred to as reserving REs for the HARQ-ACK payload. However, If the size of the HARQ-ACK payload is greater than the fixed threshold $T_1$, a variable number of REs may be allocated for the HARQ-ACK payload, and a rate matching multiplexing technique may be used. In some embodiments, this may be referred to as mapping the REs for the HARQ-ACK payload.

Table 2 illustrates two schemes for multiplexing UCI with other data on a PUSCH in accordance with example embodiments of the disclosure. The method illustrated in the left column may be used when the size of a HARQ-ACK payload is less than or equal to the fixed threshold $T_1$, while the method illustrated in the right column may be used when the size of a HARQ-ACK payload is greater than the fixed threshold $T_1$. The schemes illustrated in Table 2 may use, for example, the bit allocations illustrated in Table 1. In the scheme illustrated in the left column of Table 2, Operation 1 may be referred to as reserving REs for the HARQ-ACK payload. In the scheme illustrated in the right column of Table 2, Operation 2 may be referred to as mapping REs for the HARQ-ACK payload.

TABLE 2

| HARQ-ACK payload Length ≤ $T_1$ | HARQ-ACK payload Length > $T_1$ |
|---|---|
| Operation 1: Find and reserve REs for HARQ-ACK | Operation 1: N/A |
| Operation 2: N/A | Operation 2: Map HARQ-ACK bits to REs |
| Operation 3: | Operation 3: |
| ○ Map CSI part 1 to remaining REs (number of available REs may be > number of reserved REs for HARQ-ACK) | ○ Map CSI part 1 to remaining REs |
| | ○ Map CSI part 2 to remaining REs |
| ○ Map CSI part 2 to remaining REs | Operation 4: Map UL-SCH data bits |
| Operation 4: Map UL-SCH data bits to fill remaining REs starting from | to fill remaining REs starting from first UL-SCH data bit |
| (including reserved REs) starting from first UL-SCH data bit | Operation 5: N/A |
| Operation 5: Map HARQ-ACK bits to the reserved REs (previously filled by UL-SCH data bits starting from the first UL-SCH data bit) | |

Fixed Number of Reserved Resource Elements with Puncturing

Figure 2:
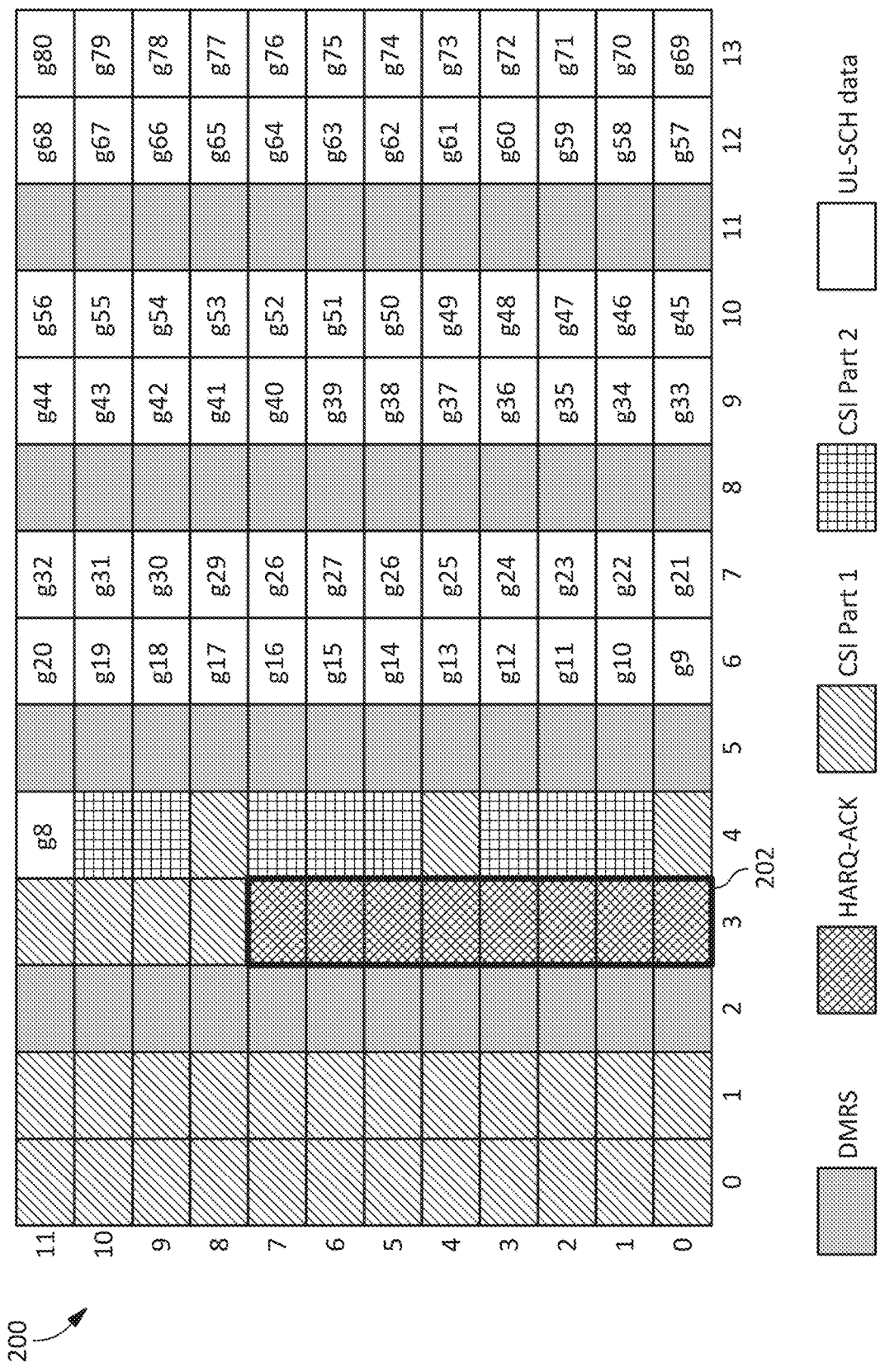
FIG. 2 illustrates an example embodiment of a method for multiplexing UCI on a PUSCH using a fixed number of reserved resource elements and a puncturing multiplexing technique in accordance with the disclosure.

FIG. 2 illustrates an example embodiment of a method for multiplexing UCI on a PUSCH using a fixed number of reserved resource elements and a puncturing multiplexing technique in accordance with the disclosure. The embodiment illustrated in FIG. 2 may be used, for example, to implement a scheme similar to that shown in the left column of Table 2 where the HARQ-ACK payload Length is less than or equal to $T_1$.

In the embodiment illustrated in FIG. 2, a PUSCH slot is shown as a resource grid 200 having OFDM symbols along the horizontal axis and subcarriers along the vertical axis. An RE may occupy each rectangle at the intersection of a subcarrier and an OFDM symbol. A vertical column of 12 REs at one OFDM symbol may form a resource block. One or more DMRS symbols (indicated by solid shading) may be located in resource blocks at fixed OFDM symbols (e.g., 2, 5, 8, and 11 in the example illustrated in FIG. 2).

The resource grid 200 may initially have no REs allocated other than the DMRS symbols. The method may then find and reserve a fixed number of reserved REs indicated by heavy rectangle 202. In this example, eight REs may be reserved at symbol 3 and subcarriers 0-7. The method may then allocate REs to CSI part 1 by mapping CSI part 1 code bits to the locations shown by diagonal single shading. The method may then allocate REs to CSI part 2 by mapping CSI part 2 code bits to the locations shown by vertical and horizontal cross-shading.

The method may then allocate the remaining REs, plus the eight reserved REs to the UL-SCH data bits beginning with $g_0$ and running through $g_{69}$ (where $g_i$ may be equal to $g_i^{UL\text{-}SCH}$). Thus, the eight REs may be reserved at symbol 3 and subcarriers 0 through 7 may initially be allocated to UL-SCH bits $g_0$ through $g_7$, respectively.

The method illustrated in FIG. 2 may then puncture the UL-SCH data bits located at symbol 3 and subcarriers 0 through 7 by replacing them with HARQ-ACK bits as shown with diagonal cross-shading. Thus, UL-SCH bits $g_0$ through $g_7$ may be displaced by HARQ-ACK bits, and only UL-SCH data bits $g_8$ through $g_{80}$ may remain.

In some embodiments, although the elimination of some UL-SCH data bits may slightly reduce the reliability of the data transmission, the redundancy, error correction, and/or other techniques used to decode the UL-SCH data bits may provide adequate reliability and still result in a relatively high probability of successful decoding.

Moreover, in the embodiment illustrated in FIG. 2, a HARQ-ACK payload size error may be relatively unlikely to cause a decoding failure because the locations of the remaining UL-SCH data bits may not change, regardless of the size of the actual HARQ-ACK payload. For example, even if the UE sends a HARQ-ACK payload having only 4 bits, and the gNB expects 8 bits, the gNB may still be able to successfully decode the remaining UL-SCH data bits (and/or CSI bits) because their locations may not change based on the number of REs for the HARQ-ACK payload. That is, a HARQ-ACK payload size error may not affect the location of the remaining UL-SCH data bits.

Variable Number of Resource Elements with Rate Matching

Figure 3:
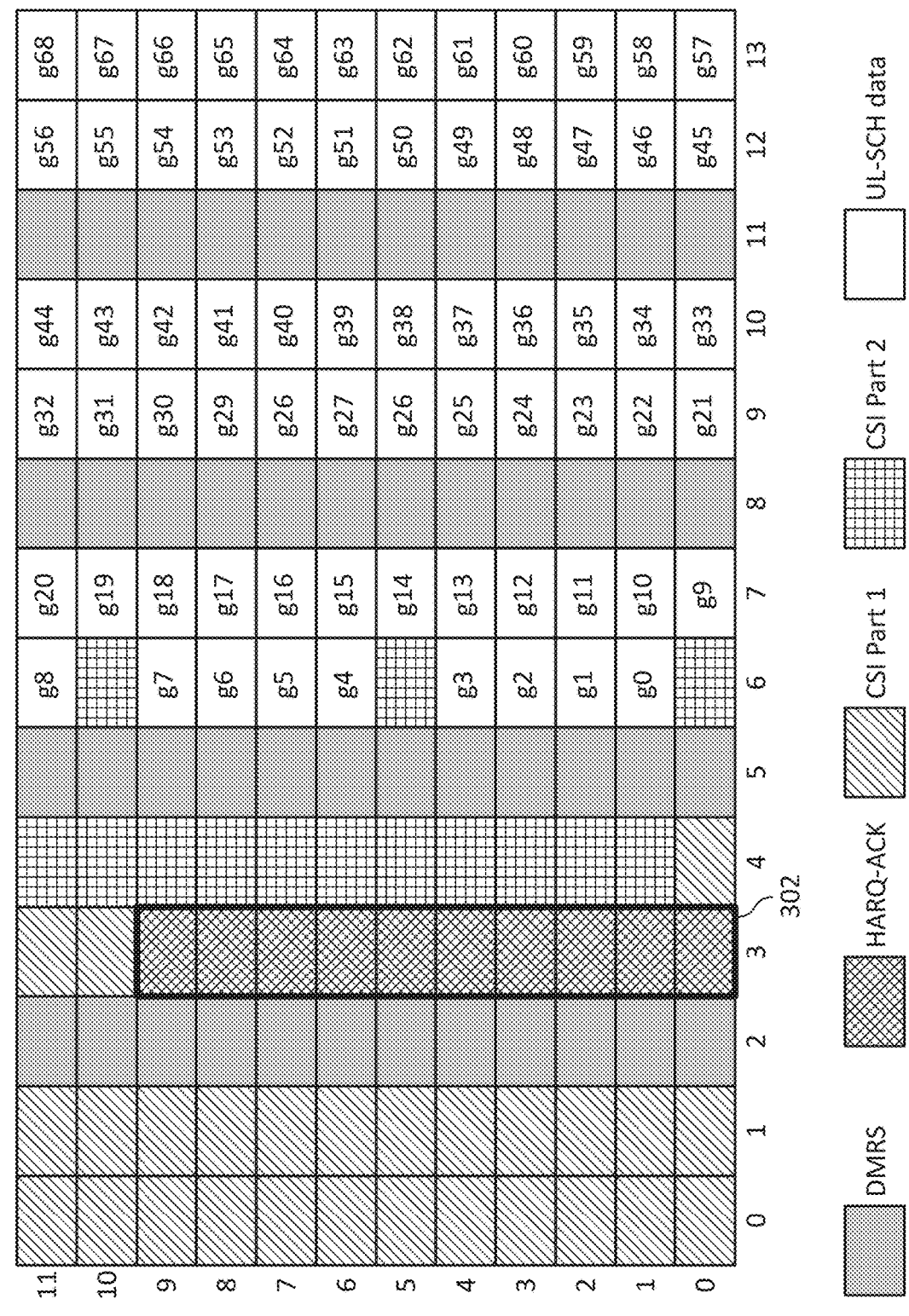
FIG. 3 illustrates an example embodiment of a method for multiplexing UCI on a PUSCH using a variable number of resource elements and a rate matching multiplexing technique in accordance with the disclosure.

FIG. 3 illustrates an example embodiment of a method for multiplexing UCI on a PUSCH using a variable number of resource elements and a rate matching multiplexing technique in accordance with the disclosure. The embodiment illustrated in FIG. 3 may be used, for example, to implement a scheme similar to that shown in the right column of Table 2 where the HARQ-ACK payload Length is greater than $T_1$.

In the embodiment illustrated in FIG. 3, the PUSCH slot may have a resource grid 300 having an initial footprint link control channel (PDCCH) which may convey downlink control information (DCI) to a UE. The DCI may include various information such as the time and/or frequency resources the UE may use to receive a PDSCH. In some embodiments, a UE may only receive a DG PDSCH by receiving the scheduling DCI associated with the DG PDSCH.

In some embodiments, an SPS PDSCH may allow a UE to receive a PDSCH without incurring the overhead associated with a scheduling DCI. For example, with an SPS PDSCH, the gNB may configure the UE with one or more SPS configurations, for example, via one or more RRC messages. An SPS configuration information element (IE) per serving cell per bandwidth part (BWP) may include periodicity, PUCCH resource information, and/or other information related to SPS operation as shown, for example, in Table 3.

TABLE 3

| - ASN1START |  |
|---|---|
| - TAG-SPS-CONFIG-START | |
| SPS-Config ::= | SEQUENCE { |
| periodicity | ENUMERATED {ms10, ms20, ms32, ms40, ms64, ms80, ms128, ms160, ms320, ms640, |
| | spare6, spare5, spare4, spare3, spare2, spare1}, |
| nrofHARQ-Processes | INTEGER (1..8), |
| n1PUCCH-AN | PUCCH-ResourceId OPTIONAL, - Need M |
| mcs-Table | ENUMERATED {qam64LowSE} OPTIONAL, - Need S |
| ... | |
| } | | similar to the embodiment illustrated in FIG. 2 with DMRS symbols located in resource blocks at fixed OFDM symbols 2, 5, 8, and 11.

The resource grid 300 may initially have no REs allocated other than the DMRS symbols. However, rather than reserving a fixed number of reserved REs, the method illustrated in FIG. 3 may allocate REs to HARQ-ACK bits by mapping a variable number of HARQ-ACK bits (in this example 10 bits) to the REs located at symbol 3 and subcarriers 0-9 as indicated by heavy rectangle 302. The method may then allocate REs to CSI part 1 by mapping CSI part 1 code bits to the locations shown by diagonal shading. The method may then allocate REs to CSI part 2 by mapping CSI part 2 code bits to the locations shown by vertical and horizontal cross-shading.

The method may then allocate the remaining REs in the resource grid 300 to UL-SCH data bits beginning with $g_0$ and running through $g_{68}$ (where $g_i$ may be equal to $g_i^{UL-SCH}$).

Compared to the embodiment illustrated in FIG. 2, in the embodiment illustrated in FIG. 3, a HARQ-ACK payload size error may be more likely to cause a decoding failure because the locations of the remaining UL-SCH data bits may change depending on the number of the variable number of REs allocated to the HARQ-ACK bits.

Multiple Active SPS PDSCH Configurations Per Serving Cell

In some NR systems in accordance with example embodiments of the disclosure, downlink traffic may be carried on different physical channels such as a DG physical downlink shared channel (PDSCH) and/or an SPS PDSCH. A DG PDSCH may be scheduled by a scheduling physical down- In some embodiments, an SPS PDSCH configuration may be activated by an instance of activation DCI which may use any DCI format that may be used to schedule a DG PDSCH. In some embodiments, activating an SPS PDSCH configuration may involve one or more additional validation mechanisms. For example, DCI for SPS activation may be scrambled by a configured scheduling radio network temporary identifier (CS-RNTI). Some DCI fields may be used specifically for the identification of SPS activation. These fields may include, for example, a new data indicator (NDI), a HARQ process number (HPN), and/or a redundancy version (RV).

The SPS activation DCI may schedule a first SPS PDSCH occasion in a manner similar to a DG PDSCH. The following SPS occasions may then be determined according to a periodicity specified in the IE in the SPS configuration and the time and/or frequency domain resources indicated by the activation DCI.

Figure 4:
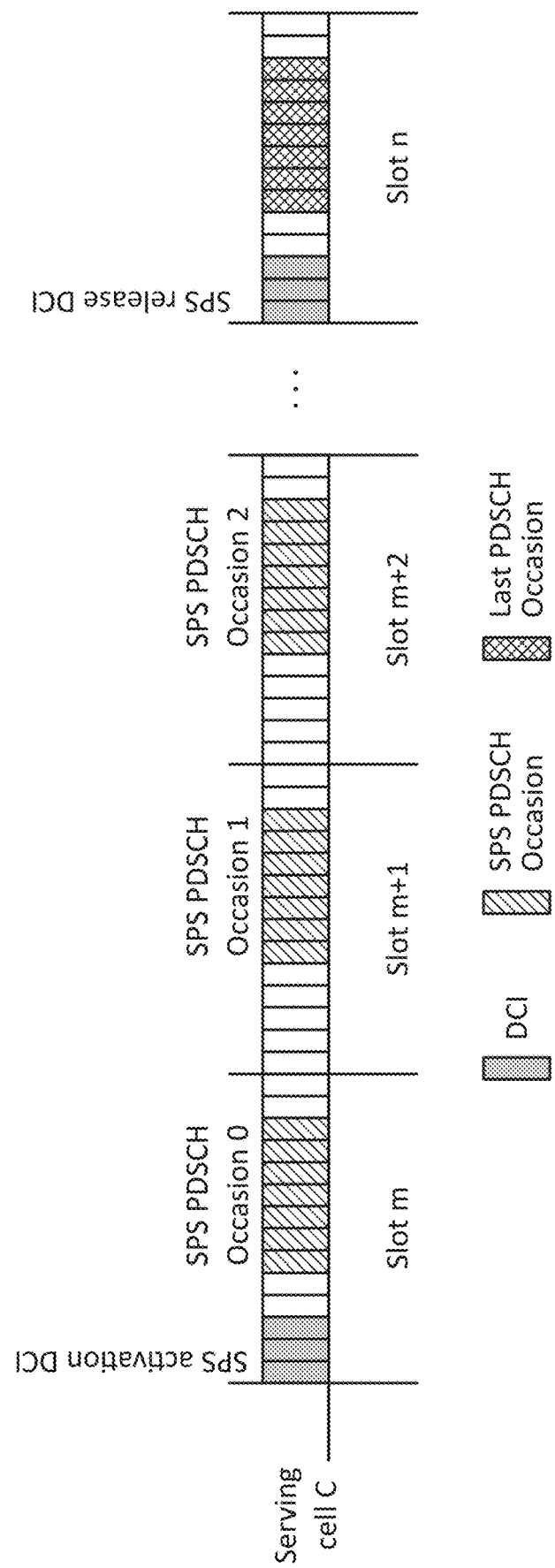
FIG. 4 illustrates an example embodiment of an SPS PDSCH sequence in accordance with the disclosure.

FIG. 4 illustrates an example embodiment of an SPS PDSCH sequence in accordance with the disclosure. For purposes of illustration, in the embodiment illustrated in FIG. 4, the periodicity may be set to one slot. In comparison, the IE illustrated in Table 3 may specify a minimum periodicity of 10 ms (e.g., 10 slots for a subcarrier spacing of 15 KHz).

Referring again to FIG. 4, the first SPS PDSCH occasion (Occasion 0) may be scheduled as a DG PDSCH in slot m, which may include the SPS activation DCI. The subsequent SPS PDSCH occasions (Occasion 1 in slot m+1, Occasion 2 in slot m+2, etc.) may be scheduled based on an SPS configuration provided via RRC which may specify periodicity, resource allocation, etc., for the subsequent SPS PDSCH occasions. In some embodiments, the time and/or frequency resource may follow those of the first SPS PDSCH occasion.

In some embodiments, the SPS PDSCH sequence illustrated in FIG. 4 may be released, for example, by an instance of release DCI in slot n. Although the release DCI may not technically schedule any resources, in some embodiments the release DCI may be associated with one last PDSCH occasion in slot n. In some embodiments, the last PDSCH occasion in slot n may be used, for example, for semi-static HARQ-ACK codebook construction. In some embodiments, however, the UE may assume that there is no SPS PDSCH reception in the last occasion in slot n.

In some embodiments, there may be up to one active SPS configuration per bandwidth part (BWP) of a serving cell. To provide a gNB with more flexibility to schedule ultra-reliable low-latency communication (uRLLC) and/or to satisfy latency requirements for uRLLC, some embodiments may allow multiple active SPS configurations per serving cell per BWP. However, in an embodiment that may allow multiple active SPS configurations per BWP of a serving cell, multiple active SPS occasions may overlap in time and/or frequency in one slot as shown in FIG. 5.

Figure 5:
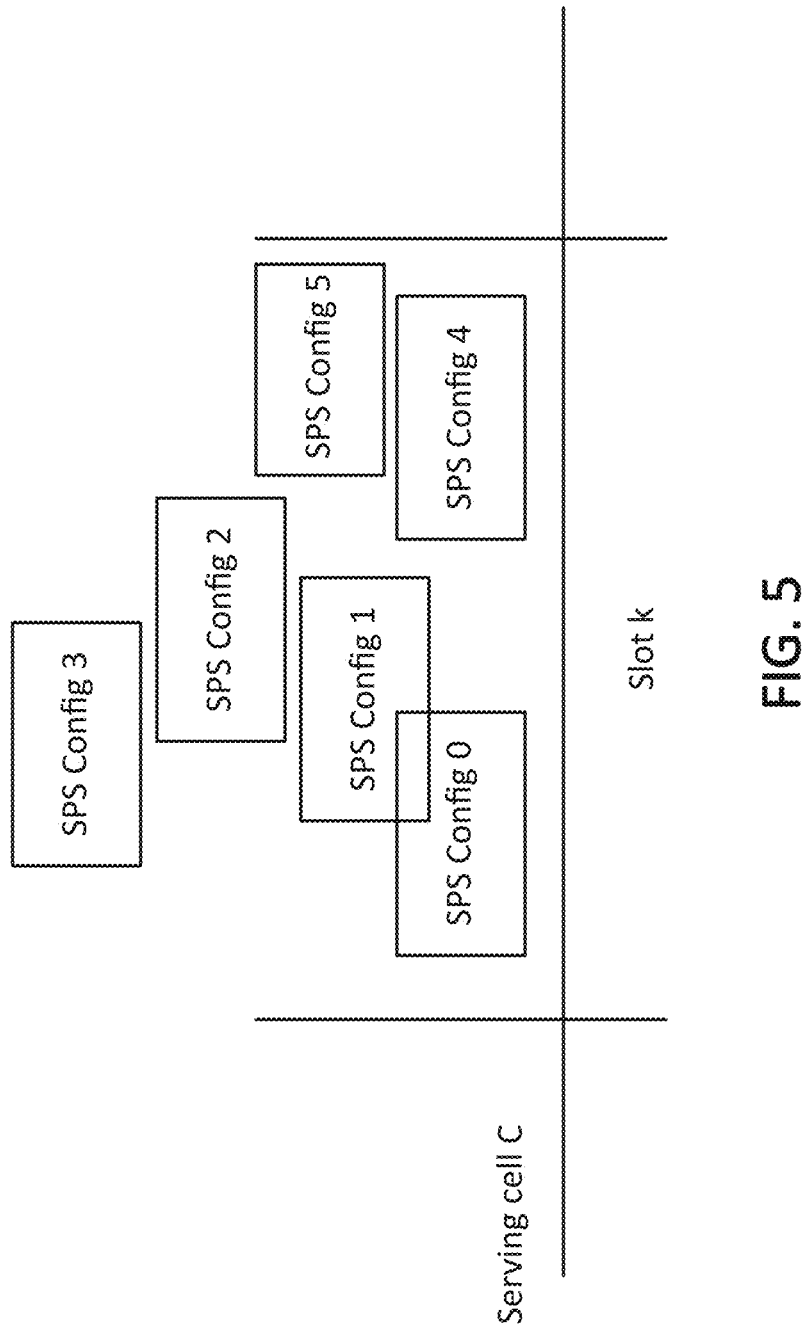
FIG. 5. illustrates an example embodiment of a slot for a serving cell in which multiple SPS configurations may overlap in accordance with the disclosure.

FIG. 5. illustrates an example embodiment of a slot for a serving cell in which multiple SPS configurations may overlap in accordance with the disclosure. In the embodiment illustrated in FIG. 5, the overlapping active SPS occasions may result in multiplexed HARQ-ACK payload errors that may be mitigated or eliminated by one or more of the multiplexing methods described herein.

HARQ-ACK Reporting on PUSCH

In some embodiments, if a network schedules a DG PUSCH that overlaps with a PUCCH carrying a HARQ-ACK payload, it may include a total downlink assignment index (T-DAI) field in the DCI scheduling the PUSCH. Depending on the implementation details, the T-DAI value may provide improved reliability for multiplexing on a PUSCH. For example, in some embodiments, a UE may loop over serving cell indices (c) and monitoring occasion (MO) indices (m) outside of two while loops for c and m. The UE may use the T-DAI field in place of the last detected, if any, T-DAI in the DCI when it loops over the indices. Depending on the implementation details, this T-DAI may help improve the reliability of a codebook (CB), for example, if some or all of the DCIs on the last MO index are missed. However, in some embodiments, this type of reliability improvement may not be applied to a CG PUSCH.

As mentioned above, in some embodiments, for a relatively small HARQ-ACK payload size (e.g., less than or equal to 2), UCI may be multiplexed onto a PUSCH using a fixed number of reserved REs for the HARQ-ACK bits, and a puncturing multiplexing technique.

Depending on the implementation details, a potential advantage of using a fixed number of reserved REs for the HARQ-ACK bits is that it may be more robust (e.g., tolerant of a HARQ-ACK payload size error, which may be referred to as a HARQ-ACK CB error probability).

In some embodiments, when using a puncturing multiplexing technique, PUSCH data symbols (e.g., UL-SCH data) may be punctured by HARQ-ACK bits at reserved REs. Depending on the implementation details, this type of puncturing technique may have an advantage over rate matching in the sense that puncturing may be more robust (e.g., tolerant of an incorrect HARQ-ACK payload size). Moreover, even if puncturing is used with a variable number of REs, it may inherently be more robust (e.g., tolerant of a HARQ-ACK CB error probability).

In contrast, in some embodiments, rate matching with a variable number of REs may be vulnerable to HARQ-ACK payload size errors. For example, referring to the embodiment illustrated in FIG. 3, if the HARQ-ACK payload size is in error, the data symbols may be shifted to different REs, which may cause the gNB and UE to have a different understanding of the data allocation of the REs. As a result, the PUSCH decoding may likely fail.

In some embodiments, if a fixed number of reserved REs is used for ACK/NACK reporting with both puncturing and rate matching techniques, the puncturing and rate matching implementations may both be robust (e.g., tolerant of HARQ-ACK payload size errors). Depending on the implementation details, the puncturing and rate matching techniques may be equally robust. Thus, if a fixed number of reserved REs is used for ACK/NACK reporting, selecting between puncturing and rate matching techniques may depend on the performance of individual punctured and/or rate matched PUSCH transmissions.

In some embodiments, however, if a variable number of REs is used for ACK/NACK reporting, and CSI is present in the multiplexed UCI (as shown, for example, in FIG. 3), neither puncturing nor rate matching may be robust (e.g., tolerant of HARQ-ACK CB errors). However, if CSI is not present in the multiplexed UCI (e.g., HARQ-ACK bits are the only type of UCI being multiplexed onto the PUSCH), then puncturing may be more robust than rate matching when used with a variable number of REs. This may be because, even with an ACK/NACK payload size error, the locations of PUSCH data REs (e.g., UL-SCH data) may be fixed, so the PUSCH decoding may be more likely to be successful. However, with an ACK/NACK payload size error, the use of a rate matching technique may cause the locations of PUSCH data REs (e.g., UL-SCH data) to shift, and therefore, the PUSCH decoding may be more likely to fail at the gNB.

HARQ-ACK Error Probability

In some embodiments, if the HARQ-ACK error probability is relatively large, and a rate matching multiplexing technique is used, it may be beneficial to use a fixed number of reserved REs for the HARQ-ACK bits. However, if a puncturing technique is used when the HARQ-ACK error probability is relatively large, then using a variable number of REs for the HARQ-ACK bits may also provide acceptable results. In some embodiments, if the HARQ-ACK error probability is relatively large, the use of a fixed number of REs for HARQ-ACK bits may provide acceptable results regardless of whether a puncturing or a rate matching technique is used.

In some embodiments, a UE may be configured for a type-2 HARQ-ACK CB. Depending on the implementation details, the reliability of a type-2 CB may be determined by the number of missing DCI events participating in the codebook. Examples of DCI events (which may be referred to as DCIs) may include DCIs that may schedule PDSCHs, DCIs that may indicate an SPS PDSCH release, DCIs that may indicate an SCell dormancy, and/or the like.

Figure 6:
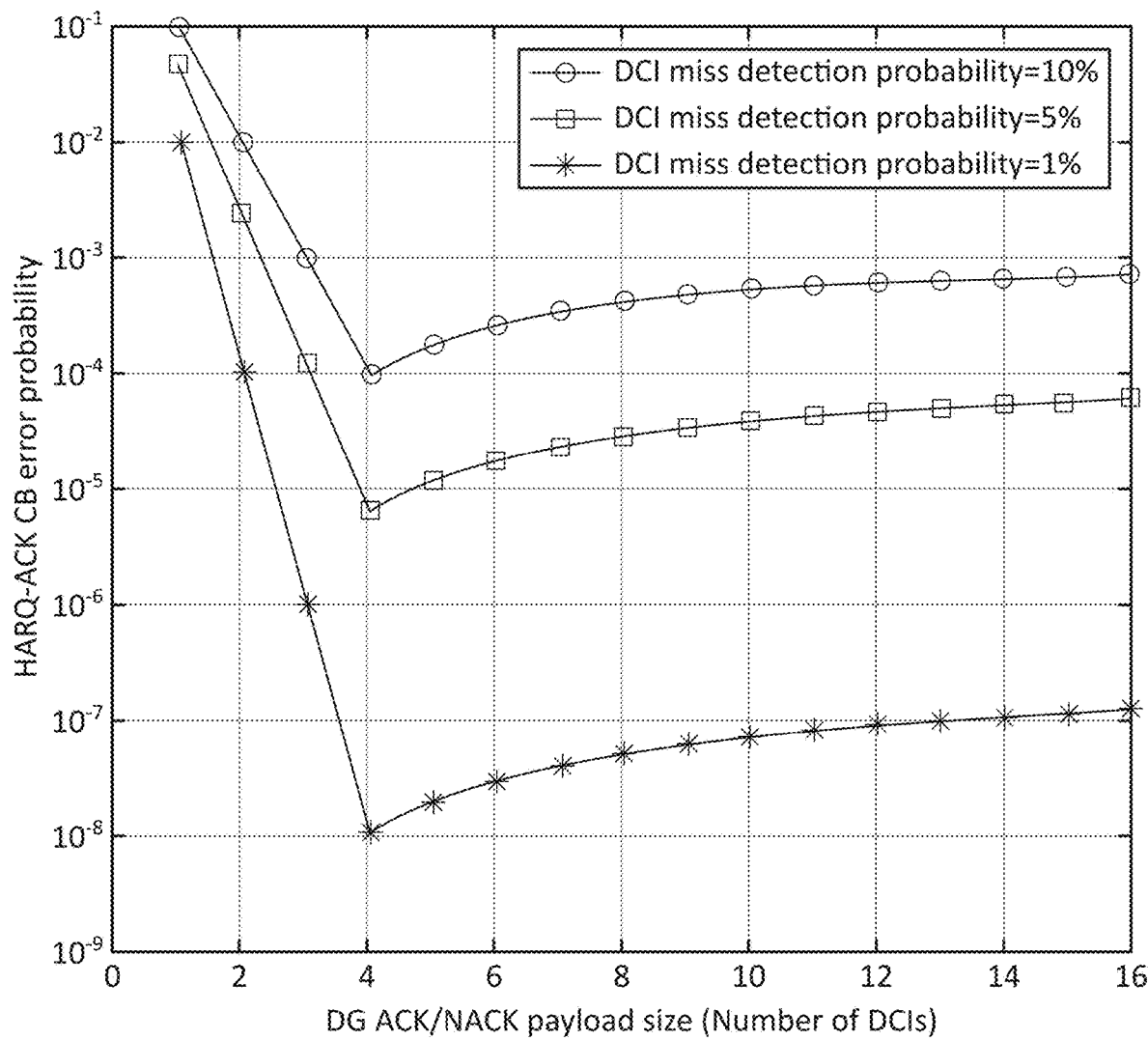
FIG. 6 illustrates an example of a type-2 HARQ-ACK CB error probability as a function of the number of DCIs participating in a codebook in accordance with the disclosure.

FIG. 6 illustrates an example of a type-2 HARQ-ACK CB error probability as a function of the number of DCIs participating in a codebook in accordance with the disclosure. In the embodiment illustrated in FIG. 6, for a given PDCCH miss detection probability and 2-bit C-DAI and T-DAI fields, when the actual number of PDCCHs participating in the codebook is less than or equal to 4, if at least one of the PDCCHs is received, the CB payload size may be correctly known by the UE. However, if all of the PDCCHs are missed, the CB payload size may be in error. In the embodiment illustrated in FIG. 6, the lowest probability of error may occur at four PDCCHs. As the number of PDCCHs increases beyond 4, the HARQ-ACK CB error probability may increase because there may be more possible instances of four consecutive PDCCHs to miss. However, in the example illustrated in FIG. 6, the HARQ-ACK error probability may generally be highest for a relatively small number of actual PDCCHs (e.g., 1, 2, or 3). In these cases, if a rate matching multiplexing technique is used with a variable number of REs for HARQ-ACK reporting, the PUSCH decoding may be likely to fail (as described above, for example, with respect to FIG. 3).

Referring again to FIG. 6, in some embodiments, the type-2 HARQ-ACK codebook error probability may be highest for the smallest number of PDCCHs participating in the codebook (e.g., for the smallest number of DG ACK/NACK bits). For these cases, the use of rate-matching with a variable number of REs for HARQ-ACK reporting may result in a relatively high rate of PUSCH decoding failure. Thus, it may be beneficial to use either a rate matching multiplexing technique with a fixed number of reserved REs or a puncturing multiplexing technique with a fixed number of reserved REs when there is a relatively small number of DG ACK/NACK bits in an ACK/NACK payload.

In some embodiments, a communication specification (e.g., Release 15 of the 5G-NR Specification by the 3rd Generation Partnership Project (3GPP)) may only allow one SPS ACK/NACK bit to participate in a HARQ codebook. Therefore, when there is a relatively small number of DG ACK/NACK bits, the total HARQ-ACK payload size may still be relatively small because only a single SPS ACK/NACK bit may be included in the total. That is, the HARQ-ACK payload size may closely reflect the number of DG ACK/NACK bits. Therefore, using a HARQ-ACK payload size threshold with a relatively small fixed value (e.g., $T_1=2$) may be adequate to ensure that a fixed number of reserved REs and a puncturing multiplexing technique are used when there is a relatively small number of DG ACK/NACK bits. Thus, a more robust (e.g., error tolerant) scheme may be used when the HARQ-ACK codebook error probability may be highest.

In some other embodiments, however, a communication specification (e.g., Release 16 of the 5G-NR Specification) may allow a relatively large number of SPS PDSCH configurations per serving cell (e.g., 8 configurations per cell). Moreover, multiple cells may be configured with SPS configurations. Thus, a relatively large number of SPS ACK/NACK bits may be allowed to participate in a HARQ codebook. As a result, the HARQ-ACK payload size may not closely reflect the number of DG ACK/NACK bits. For example, a HARQ-ACK payload having a total of 20 bits may include 19 SPS ACK/NACK bits and 1 DG ACK/NACK bit. However, if a payload size threshold with a relatively small fixed value (e.g., $T_1=2$) is used in this situation, a rate matching multiplexing technique with a variable number of REs may be used. This may result in a HARQ-ACK payload size error and a PUSCH decoding failure.

To mitigate this problem, some embodiments of systems and/or methods in accordance with the disclosure may select a scheme for allocating channel resources for acknowledgment reporting based on the number of DG ACK/NACK bits in an ACK/NACK payload, rather than the total number of bits in the ACK/NACK payload. (In some embodiments, the final implementation may still be based on the total number of bits in the ACK/NACK payload, for example, when the payload may also include SPS ACK/NACK bits. However, in these situations, the selection of a scheme for allocating channel resources for acknowledgment reporting may still be based on the number of DG ACK/NACK bits in the payload.)

Variable Threshold

Some communication systems and/or methods in accordance with example embodiments of the disclosure may use a variable threshold for selecting a scheme for allocating channel resources for acknowledgment reporting, for example, in a multiplexed PUSCH transmission. In some embodiments, the selected scheme may use a fixed number of reserved ACK/NACK bits, a variable number of ACK/NACK bits, and/or any other suitable configuration of ACK/NACK bits. In some embodiments, the selected scheme may use a puncturing multiplexing technique, a rate matching multiplexing technique, and/or any other suitable multiplexing technique.

In some embodiments, a system and/or method in accordance with the disclosure may be based on the following observations: (1) in some embodiments, a HARQ-ACK CB error probability may generally be relatively large for a small number of DG ACK/NACK bits; and (2) if at any payload size and number of DG or SPS ACK/NACK bits, the HARQ-ACK CB error probability is relatively high (e.g., the UE may determine an incorrect payload size), the use of a fixed number of reserved REs (with a puncturing or rate matching multiplexing technique) for HARQ-ACK reporting may reduce the probability of decoding failures. Moreover, in some embodiments, and depending on the implementation details, the use of a puncturing multiplexing technique for HARQ-ACK reporting may reduce the probability of decoding failures.

For purposes of illustration, the following embodiments provide examples of methods for determining a variable threshold T that may be used to select a scheme for allocating channel resources for acknowledgment reporting in accordance with the disclosure. The following examples may be applied, for example, to any of the systems and/or methods disclosed herein. For example, a variable threshold T as provided in the following examples may be used to replace the fixed threshold $T_1$ in the embodiments illustrated above with respect to Table 2 and FIGS. 2 and 3. The principles, however, are not limited to any of these applications or any of the following example implementation details. In the following example embodiments, $T_{SPS}$ may indicate a number of SPS ACK/NACK bits.

Example 1-1: ($T_{DG}$ as a fixed number) If the UE multiplexes HARQ-ACK bits on a PUSCH, the UE may determine a threshold T for reserving the number of REs of a PUSCH as follows. T may be determined based on the number of SPS ACK/NACK bits and the number of DG ACK/NACK bits in the HARQ-ACK payload such that T=number of SPS ACK/NACK bits+$T_{DG}$, where $T_{DG}$ may be 1, 2, or any other fixed number. If the HARQ-ACK payload size is smaller than or equal to T, one of the following two schemes may be used: puncturing with a fixed number of reserved REs determined assuming T ACK/NACK bits, or rate matching with a fixed number of reserved REs determined assuming T ACK/NACK bits.

Table 4 provides a comparison of example results that may be provided by Method 1, which may be implemented as described in Table 2 with $T_1=2$, and Example 1-1 with $T_{DG}=2$. As may be apparent from Table 4, the method provided by Example 1-1 may implement a puncturing multiplexing technique with a fixed number or reserved REs for ACK/NACK payloads having a relatively large number of SPS ACK/NACK bits and a relatively small number of DG ACK/NACK bits. Depending on the implementation details, this may reduce the probability of decoding failures.

TABLE 4

| ACK/NACK payload | Method 1 | Example 1-1 |
| --- | --- | --- |
| 1 DG + 1 SPS | Puncturing with fixed number or reserved REs with T = 2 | Puncturing with fixed number or reserved REs |
| 1 DG + 9 SPS | Rate matching with variable number of REs | Puncturing with fixed number or reserved REs |
| 5 DG + 5 SPS | Rate matching with variable number of REs | Rate matching with variable number of REs |
| 9 DG + 1 SPS | Rate matching with variable number of REs | Rate matching with variable number of REs |

In some embodiments, the number of active SPS configurations or the total number of configured SPS configurations regardless of activation status may also be used as described in the following.

Example 1-2: ($T_{DG}$ as a fixed number) If the UE multiplexes HARQ-ACK bits on a PUSCH, the UE may determine a threshold T for reserving the number of REs of a PUSCH as follows. T may be determined based on the number of SPS configurations or the number of active SPS configurations and the number of DG ACK/NACK bits in the HARQ-ACK payload as T=(number of SPS configurations)+$T_{DG}$ or T=(number of active SPS configurations)+$T_{DG}$ where $T_{DG}$ may be 1, 2, or any other fixed number. If the HARQ-ACK payload size is smaller than or equal to T, one of the following two schemes may be used: puncturing with a fixed number of reserved REs determined assuming T ACK/NACK bits, or rate matching with a fixed number of reserved REs determined assuming T ACK/NACK bits.

Example 1-1 (Alternative) If the UE multiplexes HARQ-ACK bits on a PUSCH, and if the number of DG ACK/NACK bits is less than or equal to 1, 2, or any fixed number, one of the following two schemes may be used: puncturing with a fixed number of reserved REs determined assuming T=number of SPS ACK/NACK bits+2 as the total ACK/NACK payload size; or rate matching with a fixed number of reserved REs determined assuming T=number of SPS ACK/NACK bits+2 as the total ACK/NACK payload size.

In some embodiments, the type-2 HARQ-ACK CB error probability may be related to the bitwidth of the DAI field in a DCI. If the bitwidth of the DAI field increases, the HARQ CB may provide better error correction capability. As an example with a DAI bitwidth of 2, missing four consecutive DCIs in a row (e.g., in the same MO index) may result in a CB error event, while for a DAI bitwidth of 3, eight consecutive missing DCIs may be needed to result in a CB error. Therefore, in some embodiments, four actual DCIs in the HARQ CB may be more prone to error for a bitwidth of 2 than a bitwidth of 3. Thus, in some embodiments, the threshold for selecting a scheme using a fixed number of REs may consider the bitwidth of a DAI field as set forth in the following two examples.

Example 1-3: ($T_{DG}$ as a function of DAI bitwidth) If the UE multiplexes HARQ-ACK bits on a PUSCH, the UE may determine a threshold T for reserving the number of REs of a PUSCH as follows. T may be determined based on the number of SPS ACK/NACK bits and the number of DG ACK/NACK bits in the HARQ-ACK payload such that T=number of SPS ACK/NACK bits+$T_{DG}$. In some embodiments, $T_{DG}$ may be determined as a non-increasing function of the bitwidth of the DAI field in the DCIs participating in the codebook. If the HARQ-ACK payload size is smaller than or equal to T, one of the following two schemes may be used: puncturing with a fixed number of reserved REs determined assuming T ACK/NACK bits; or rate matching with a fixed number of reserved REs determined assuming T ACK/NACK bits Example 1-4: ($T_{DG}$ as a function of DAI bitwidth) If the UE multiplexes HARQ-ACK bits on a PUSCH, the UE may determine a threshold T for reserving the number of REs of a PUSCH as follows. T may be determined based on the number of SPS configurations or the number of active SPS configurations and the number of DG ACK/NACK bits in the HARQ-ACK payload such that T=(number of SPS configurations)+$T_{DG}$ or T=(number of active SPS configurations)+$T_{DG}$. In some embodiments, $T_{DG}$ may be determined as a decreasing function of the bitwidth of the DAI field in the DCIs participating in the codebook. If the HARQ-ACK payload size is smaller than or equal to T, one of the following two schemes may be used: puncturing with a fixed number of reserved REs determined assuming T ACK/NACK bits; or rate matching with a fixed number of reserved REs determined assuming T ACK/NACK bits.

In some embodiments, a network may determine a value of $T_{DG}$ based on the number of SPS bits in a codebook. For example if the network intends to use a relatively small number of SPS bits in the codebook, it may configure UE with a small value of $T_{DG}$, while if it intends to use a relatively large number of SPS bits in the codebook, it may configure a larger number of $T_{DG}$. In this type of embodiment, it may also configure different values of $T_{DG}$ based on the configured bitwidth of the DAI fields in the DCI.

Example 1-5: If the UE multiplexes HARQ-ACK bits on a PUSCH, the UE may determine a threshold T for reserving the number of REs of a PUSCH as follows. T may be determined based on the number of SPS ACK/NACK bits and the number of DG ACK/NACK bits in the HARQ-ACK payload such that T=number of SPS ACK/NACK bits+$T_{DG}$. In some embodiments, $T_{DG}$ may be determined from an RRC configuration, wherein the network may configure UE with a value of $T_{DG}$. If the HARQ-ACK payload size is smaller than or equal to T, one of the following two schemes may be used: puncturing with a fixed number of reserved REs determined assuming T ACK/NACK bits; or rate matching with a fixed number of reserved REs determined assuming T ACK/NACK bits.

Example 1-6: If the UE multiplexes HARQ-ACK bits on a PUSCH, the UE may determine a threshold T for reserving the number of REs of a PUSCH as follows. T may be determined based on the number of SPS configurations or the number of active SPS configurations and the number of DG ACK/NACK bits in the HARQ-ACK payload such that T=(number of SPS configurations)+$T_{DG}$ or T=(number of active SPS configurations)+$T_{DG}$. In some embodiments, $T_{DG}$ may be determined from an RRC configuration, wherein the network may configure UE with a value of $T_DC$. If the HARQ-ACK payload size is smaller than or equal to T, one of the following two schemes may be used: puncturing with a fixed number of reserved REs determined assuming T ACK/NACK bits; or rate matching with a fixed number of reserved REs determined assuming T ACK/NACK bits.

Some of the examples above may determine the value of the threshold T by considering the number of DG ACK/NACK bits in the HARQ CB. Alternatively, a fixed number may be used for a total number of ACK/NACK bits participating in the CB without differentiating the SPS bits from DG bits as set forth in the following examples.

Example 2-1: If the UE multiplexes HARQ-ACK bits on a PUSCH, the UE may determine a threshold T for reserving the number of REs of a PUSCH as follows. T may be determined based on the number of SPS ACK/NACK bits. T may be a non-decreasing function of the number of SPS ACK/NACK bits. If the HARQ-ACK payload size is smaller than or equal to T, one of the following two schemes may be used: puncturing with a fixed number of reserved REs determined assuming T ACK/NACK bits; or rate matching with a fixed number of reserved REs determined assuming T ACK/NACK bits.

Example 2-2: If the UE multiplexes HARQ-ACK bits on a PUSCH, the UE may determine a threshold T for reserving the number of REs of a PUSCH as follows. T may be determined based on the number of SPS configurations or the number of active SPS configurations. T may be a non-decreasing function of the number of SPS configurations or a non-decreasing function of the number of active SPS configurations. If the HARQ-ACK payload size is smaller than or equal to T, one of the following two schemes may be used: puncturing with a fixed number of reserved REs determined assuming T ACK/NACK bits; or rate matching with a fixed number of reserved REs determined assuming T ACK/NACK bits.

Example 2-3: If the UE multiplexes HARQ-ACK bits on a PUSCH, the UE may determine a threshold T for reserving the number of REs of a PUSCH as follows. T may be determined as a non-decreasing function of the bitwidth of the DAI filed in the DCIs participating in the codebook. If the HARQ-ACK payload size is smaller than or equal to T, one of the following two schemes may be used: puncturing with a fixed number of reserved REs determined assuming T ACK/NACK bits; or rate matching with a fixed number of reserved REs determined assuming T ACK/NACK bits.

Example 2-4: If the UE multiplexes HARQ-ACK bits on a PUSCH, the UE may determine a threshold T for reserving the number of REs of a PUSCH as follows. T may be determined from an RRC configuration, wherein the network may configure UE with a value of T. If the HARQ-ACK payload size is smaller than or equal to T, one of the following two schemes may be used: puncturing with a fixed number of reserved REs determined assuming T ACK/NACK bits; or rate matching with a fixed number of reserved REs determined assuming T ACK/NACK bits.

In some embodiments, the selection of a multiplexing scheme may be related to the reliability of a HARQ-ACK codebook. In some embodiments, a Type-1 CB may generally be more reliable than a Type-2 CB. However, the methods disclosed herein may be used with a Type-1 CB, a Type-2 CB, or any other type of CB.

In some embodiments, a HARQ CB may be more reliable when used for a DG PUSCH with a DAI field compared to a CG PUSCH (or a DG PUSCH without a DAI field). For example, when a UE multiplexes one DG ACK/NACK on a CG PUSCH, if the UE misses the DCI, the CB size may be in error. However, when a UE multiplexes 1 DG ACK/NACK on DG PUSCH with a DAI field, even if the UE misses the DCI, the T-DAI from the DCI scheduling the PUSCH may be used to determine the correct payload size. Thus, in some embodiments, any of the examples described above may be applied to a DG PUSCH with a DAI field. Depending on the implementation details, this may further improve the reliability of the multiplexed acknowledgment reporting.

The following examples may elaborate on the applicability of examples 1-1 to 2-4 to different PUSCH and HARQ-ACK types.

Example 3-1: (Type-2 CB and CG PUSCH or DG PUSCH without a DAI field) If the UE is configured with a type-2 HARQ-ACK codebook and the UE is to multiplex HARQ-ACK bits on a CG PUSCH or a DG PUSCH without a DAI field, the UE may determine a threshold T for reserving the number of REs of a PUSCH in a manner similar to any of examples 1-1 to 2-4 and apply a puncturing or rate matching multiplexing technique.

Example 3-2: (Type-2 CB and DG PUSCH with a DAI field) If the UE is configured with a type-2 HARQ-ACK codebook and the UE is to multiplex HARQ-ACK bits on a dynamic grant PUSCH with a DAI field, the UE may determine a threshold T for reserving the number of REs of a PUSCH in a manner similar to any of the examples 1-1 to 2-4 and apply a puncturing or rate matching multiplexing technique.

Example 3-3: (Type-1 CB and CG PUSCH or DG PUSCH without with a DAI field) If the UE is configured with a type-1 HARQ-ACK codebook and the UE is to multiplex HARQ-ACK bits on a CG PUSCH or a DG PUSCH without a DAI field, the UE may determine a threshold T for reserving the number of REs of a PUSCH in a manner similar to any of the examples 1-1 to 2-4 and apply a puncturing or rate matching multiplexing technique.

Example 3-4: (Type-1 CB and DG PUSCH with DAI field) If the UE is configured with a type-1 HARQ-ACK codebook and the UE is to multiplex HARQ-ACK bits on a dynamic grant PUSCH with a DAI field, the UE may determine a threshold T for reserving the number of REs of a PUSCH in a manner similar to any of the examples 1-1 to 2-4 and apply a puncturing or rate matching multiplexing technique.

User Equipment

Figure 7:
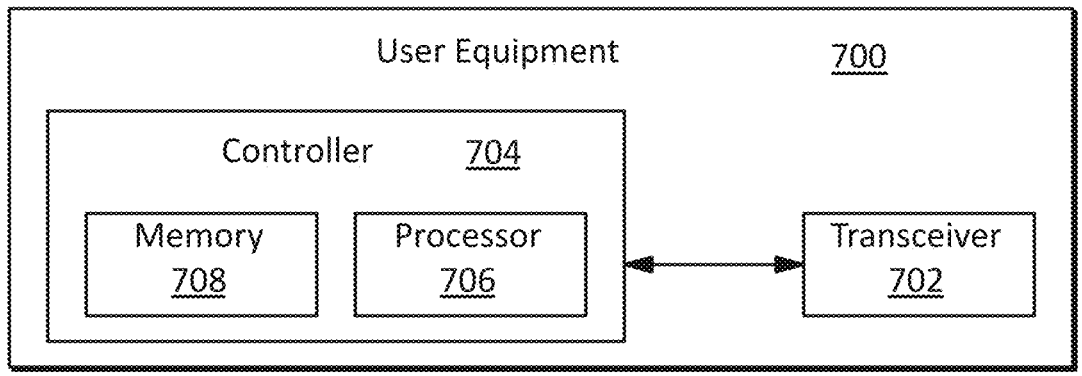
FIG. 7 illustrates an example embodiment of a user equipment (UE) in accordance with the disclosure.

FIG. 7 illustrates an example embodiment of a user equipment (UE) in accordance with the disclosure. The UE 700 illustrated in FIG. 7 may include a radio transceiver 702 and a controller 704 which may control the operation of the transceiver 702 and/or any other components in the UE 700. The UE 700 may be used, for example, to implement any of the functionality described in this disclosure including multiplexing control information on a physical channel in a communication system, allocating an amount of resources of the physical channel for the repeat request acknowledgment portion, selecting a scheme to determine resources to use for a multiplexed ACK/NACK payload (e.g., a fixed number of reserved REs, a variable number of REs, a puncturing multiplexing technique, a rate matching multiplexing technique, etc.), and/or the like.

The transceiver 702 may transmit/receive one or more signals to/from a base station, and may include an interface unit for such transmissions/receptions. For example, the transceiver 702 may transmit/receive PDCCH, PDSCH, PUCCH and/or PUSCH signals and/or the like to/from a base station.

The controller 704 may include, for example, one or more processors 706 and a memory 708 which may store instructions for the one or more processors 706 to execute code to implement any of the functionality described in this disclosure. For example, the controller 704 may be used to implement any of the functionality described in this disclosure including multiplexing control information on a physical channel in a communication system, allocating an amount of resources of the physical channel for the repeat request acknowledgment portion, selecting a scheme to determine resources to use for a multiplexed ACK/NACK payload (e.g., a fixed number of reserved REs, a variable number of REs, a puncturing multiplexing technique, a rate matching multiplexing technique, etc.), and/or the like.

Base Station

Figure 8:
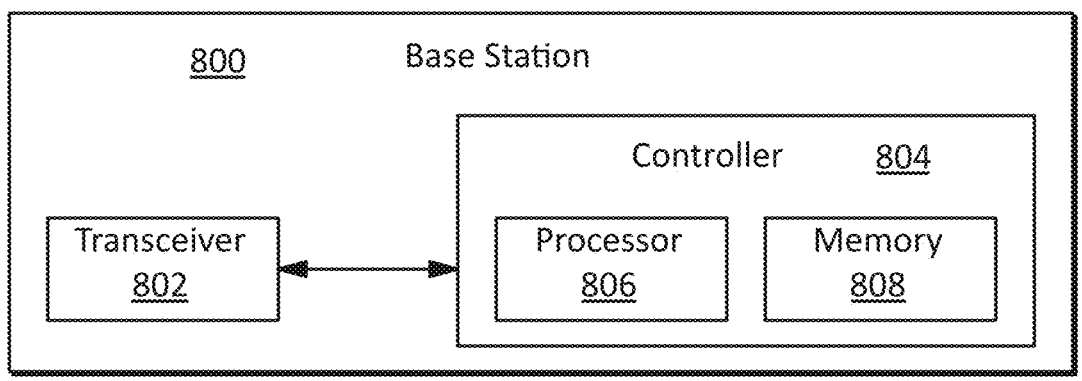
FIG. 8 illustrates an example embodiment of a base station in accordance with the disclosure.

FIG. 8 illustrates an example embodiment of a base station in accordance with the disclosure. The base station 800 illustrated in FIG. 8 may include a radio transceiver 802 and a controller 804 which may control the operation of the transceiver 802 and/or any other components in the base station 800. The base station 800 may be used, for example, to implement any of the functionality described in this disclosure including multiplexing control information on a physical channel in a communication system, allocating an amount of resources of the physical channel for the repeat request acknowledgment portion, selecting a scheme to determine resources to use for a multiplexed ACK/NACK payload (e.g., a fixed number of reserved REs, a variable number of REs, a puncturing multiplexing technique, a rate matching multiplexing technique, etc.), and/or the like.

The transceiver 802 may transmit/receive one or more signals to/from a UE, and may include an interface unit for such transmissions/receptions. For example, the transceiver 802 may transmit/receive PDCCH, PDSCH, PUCCH and/or PUSCH signals and/or the like to/from a UE.

The controller 804 may include, for example, one or more processors 806 and a memory 808 which may store instructions for the one or more processors 806 to execute code to implement any of the base station functionality described in this disclosure. For example, the controller 804 may be used to implement any of the functionality described in this disclosure including multiplexing control information on a physical channel in a communication system, allocating an amount of resources of the physical channel for the repeat request acknowledgment portion, selecting a scheme to determine resources to use for a multiplexed ACK/NACK payload (e.g., a fixed number of reserved REs, a variable number of REs, a puncturing multiplexing technique, a rate matching multiplexing technique, etc.), and/or the like.

In the embodiments illustrated in FIGS. 7 and 8, the transceivers 702 and 802 may be implemented with various components to receive and/or transmit RF signals such as amplifiers, filters, modulators and/or demodulators, A/D and/or DA converters, antennas, switches, phase shifters, detectors, couplers, conductors, transmission lines, and/or the like. The controllers 704 and 804 may be implemented with hardware, software, and/or any combination thereof. For example, full or partial hardware implementations may include combinational logic, sequential logic, timers, counters, registers, gate arrays, amplifiers, synthesizers, multiplexers, modulators, demodulators, filters, vector processors, complex programmable logic devices (CPLDs), field programmable gate arrays (FPGAs), application specific integrated circuits (ASICs), systems on chip (SOC), state machines, data converters such as ADCs and DACs, and/or the like. Full or partial software implementations may include one or more processor cores, memories, program and/or data storage, and/or the like, which may be located locally and/or remotely, and which may be programmed to execute instructions to perform one or more functions of the controllers. Some embodiments may include one or more CPUs such as a complex instruction set computer (CISC) processor (e.g., an x86 processor) and/or a reduced instruction set computer (RISC) processor (e.g., an ARM processor), graphics processing units (GPUs), neural processing units (NPUs), tensor processing units (TPUs), and/or the like, executing instructions stored in any type of memory.

Additional Embodiments

Some embodiments may implement systems and/or methods for HARQ-ACK multiplexing on a PUSCH for multiple active SPS PDSCH configurations. Some embodiments may involve multiple active SPS PDSCH configurations per bandwidth part and may accordingly implement one or more UE procedures to multiplex HARQ-ACK bits into a PUSCH. In some embodiments, a threshold may determine the number of REs for UCI multiplexing on a PUSCH. In some embodiments, the threshold may be a function of the number of SPS ACK/NACK bits a UE has to multiplex. Some embodiments may provide one or more methods to determine UE behavior when multiplexing ACK/NACK bits into a PUSCH. Some embodiments may take into consideration having multiple ACK/NACK bits in a HARQ-ACK codebook payload, and/or the error probability of a payload size. In some embodiments, a threshold may be defined as a function of a number of SPS A/N bits.

Figure 9:
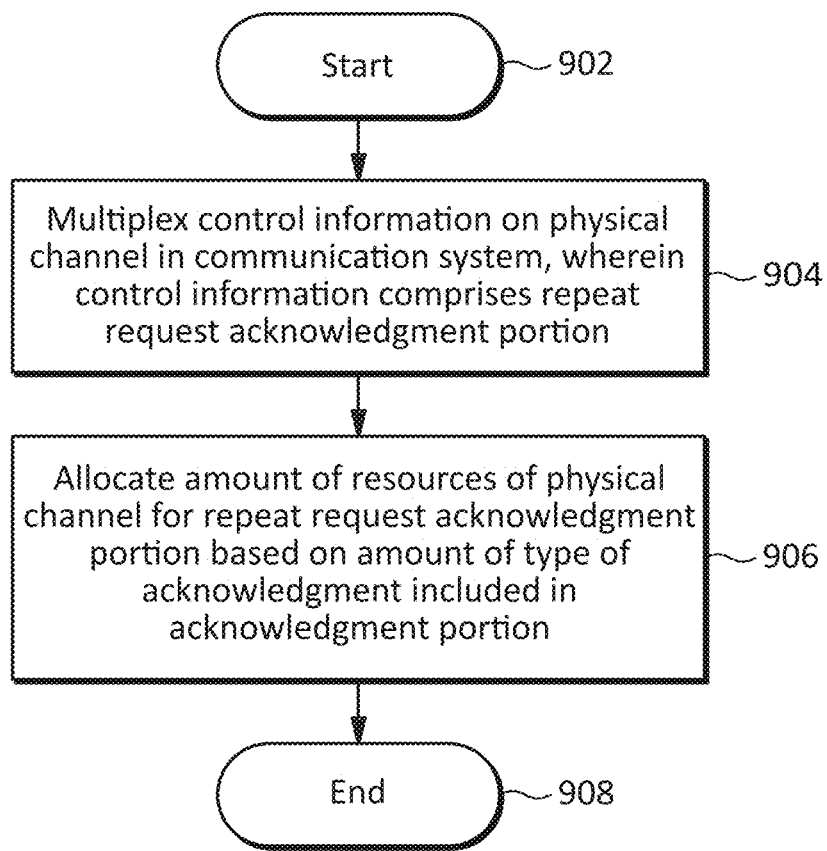
FIG. 9 illustrates an embodiment of a method for multiplexing control information in accordance with the disclosure.

FIG. 9 illustrates an embodiment of a method for multiplexing control information in accordance with the disclosure. The method may begin at operation 902. At operation 904, the method may multiplex control information on a physical channel in a communication system, wherein the control information comprises a repeat request acknowledgment portion. At operation 906, the method may allocate an amount of resources of the physical channel for the repeat request acknowledgment portion based on an amount of a type of acknowledgment included in the acknowledgment portion. The method may end at operation 908.

Figure 10:
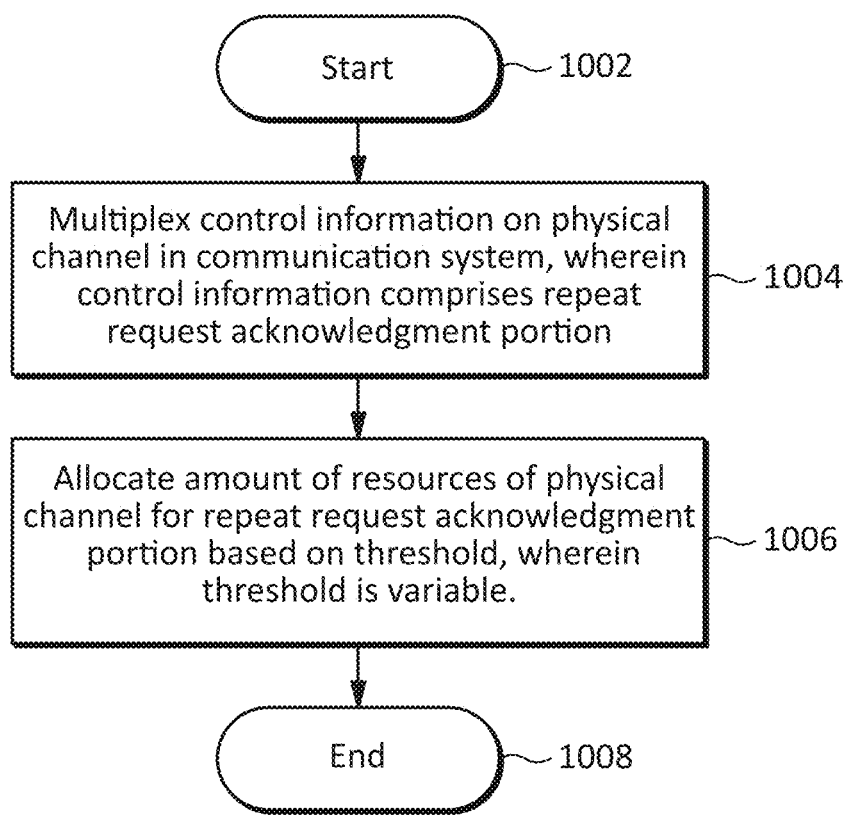
FIG. 10 illustrates an embodiment of another method for multiplexing control information in accordance with the disclosure.

FIG. 10 illustrates an embodiment of another method for multiplexing control information in accordance with the disclosure. The method may begin at operation 1002. At operation 1004, the method may multiplex control information on a physical channel in a communication system, wherein the control information comprises a repeat request acknowledgment portion. At operation 1006, the method may allocate an amount of resources of the physical channel for the repeat request acknowledgment portion based on a threshold, wherein the threshold is variable. The method may end at operation 1008.

In the embodiments illustrated in FIGS. 9 and 10, the illustrated components and/or operations are exemplary only. Some embodiments may involve various additional components and/or operations not illustrated, and some embodiments may omit some components and/or operations. Moreover, in some embodiments, the arrangement of components and/or temporal order of the operations may be varied. Although some components and/or operations may be illustrated as individual components and/or operations, in some embodiments, some components and/or operations shown separately may be integrated into single components and/or operations, and/or some components and/or operations shown as single components and/or operations may be implemented with multiple components and/or operations.

The embodiments disclosed herein may be described in the context of various implementation details, but the principles of this disclosure are not limited to these or any other specific details. Some functionality has been described as being implemented by certain components, but in other embodiments, the functionality may be distributed between different systems and components in different locations. A reference to a component or element may refer to only a portion of the component or element. The term "based on" may mean based at least in part on. The use of terms such as "first" and "second" in this disclosure and the claims may only be for purposes of distinguishing the things they modify and may not indicate any spatial or temporal order unless apparent otherwise from context. In some situations, "first" and "second" may refer to the same and/or different things. A reference to a first thing may not imply the existence of a second thing. Moreover, the various details and embodiments described above may be combined to produce additional embodiments according to the inventive principles of this patent disclosure. Various organizational aids such as section headings and the like may be provided as a convenience, but the subject matter arranged according to these aids and the principles of this disclosure are not defined or limited by these organizational aids.

Since the inventive principles of this patent disclosure may be modified in arrangement and detail without departing from the inventive concepts, such changes and modifications are considered to fall within the scope of the following claims.

The invention claimed is:

1. A method comprising:
multiplexing control information on a physical channel in a communication system, wherein the control information comprises a repeat request acknowledgment portion; and
allocating an amount of resources of the physical channel for the repeat request acknowledgment portion based on a threshold and based on a first amount of a first type of acknowledgment included in the acknowledgment portion and a second amount of a second type of acknowledgment included in the acknowledgment portion, wherein the threshold is based on a probability of a payload size error associated with the repeat request acknowledgment portion.

2. The method of claim 1, wherein the first type of acknowledgment comprises an acknowledgment for dynamically granted traffic.

3. The method of claim 2, wherein allocating the amount of resources comprises allocating a variable amount of resources based on the first amount of the first type of acknowledgment for dynamically granted traffic exceeding the threshold.

4. The method of claim 3, wherein the multiplexing comprises rate matching.

5. The method of claim 2, wherein allocating the amount of resources comprises allocating a reserved amount of resources based on the first amount of the first type of acknowledgment for dynamically granted traffic being less than the threshold.

6. The method of claim 5, wherein the first amount of the first type of acknowledgment comprises a number of acknowledgment bits.

7. The method of claim 5, wherein the multiplexing comprises puncturing.

8. The method of claim 5, wherein the threshold is based on the first amount of the first type of acknowledgment included in the acknowledgment portion.

9. The method of claim 5, wherein the threshold comprises:
a first component based on the first type of acknowledgment; and
a second component based on the second type of acknowledgment.

10. The method of claim 9, wherein:
the first component comprises a variable amount based on one or more acknowledgments for semi-persistently scheduled traffic; and
the second component comprises a fixed amount based on one or more acknowledgments for dynamically granted traffic.

11. The method of claim 9, wherein:
the first component is based on one or more configurations for semi-persistently scheduled traffic; and
the second component comprises an amount based on one or more acknowledgments for dynamically granted traffic.

12. The method of claim 5, wherein allocating the amount of resources comprises allocating a reserved amount of resources based on the threshold and a size of the acknowledgment portion.

13. The method of claim 12, wherein:
allocating the amount of resources comprises allocating a variable amount of resources based on the threshold and a size of the acknowledgment portion; and
the multiplexing comprises rate matching.

14. The method of claim 1, wherein the repeat request acknowledgment portion comprises a codebook.

15. The method of claim 14, wherein:
the physical channel comprises a physical uplink shared channel (PUSCH); and
the codebook comprises a Type-2 hybrid automatic repeat request acknowledgment (HARQ-ACK) codebook.

16. The method of claim 1, wherein the error probability of the payload size error is based on a number of downlink control information (DCI) transmissions.

17. A method comprising:
multiplexing control information on a physical channel in a communication system, wherein the control information comprises a repeat request acknowledgment portion; and
allocating an amount of resources of the physical channel for the repeat request acknowledgment portion based on a threshold and based on a first amount of a first type of acknowledgment included in the acknowledgment portion and a second amount of a second type of acknowledgment included in the acknowledgment portion, wherein the threshold is based on a probability of a payload size error associated with the repeat request acknowledgment portion;
wherein the threshold is variable.

18. An apparatus comprising:
a transceiver configured to multiplex a repeat request acknowledgment payload on a physical channel; and
a controller configured to allocate an amount of resources of the physical channel to the repeat request acknowledgment payload based on a threshold and based on a first number of first acknowledgments for a first type of traffic included in the payload and a second number of second acknowledgements for a second type of traffic, wherein the threshold is based on a probability of a payload size error associated with a size of the repeat request acknowledgment portion.

19. The apparatus of claim 18, wherein the controller is further configured to allocate a reserved amount of resources based on the first number of first acknowledgments for the first type of traffic included in the payload and the second number of second acknowledgments for the second type of traffic included in the payload.

* * * * *